United States Patent [19]
Yang

[11] Patent Number: 5,455,884
[45] Date of Patent: Oct. 3, 1995

[54] STEPPED COMPOUND VOLTAGE CONTROL CIRCUIT OF BATTERY IN COMBINATION WITH FIELD-CONTROL DC MOTOR DRIVING CIRCUIT

[76] Inventor: Tai-Her Yang, 5-1 Taipin St., Si-Hu Town, Dzan-Hwa, Taiwan

[21] Appl. No.: 67,963

[22] Filed: May 27, 1993

[51] Int. Cl.[6] ............................................. H02P 5/162
[52] U.S. Cl. ........................ 388/803; 388/804; 388/806; 318/251
[58] Field of Search ......................... 318/105, 106, 318/107, 108, 109, 248, 459, 500, 251; 388/803, 804, 809, 811, 819, 826, 829, 831, 806; 361/1, 2, 4, 100, 142, 178

[56] References Cited

U.S. PATENT DOCUMENTS

| | | |
|---|---|---|
| 3,387,194 | 6/1968 | Banks . |
| 3,984,744 | 10/1976 | Moody . |
| 4,131,833 | 12/1978 | McAuliffe et al. . |
| 4,570,211 | 2/1986 | Manda et al. . |

Primary Examiner—Bentsu Ro
Attorney, Agent, or Firm—Bacon & Thomas

[57] ABSTRACT

A multiple output stepped compound voltage supply includes a field intensity control which enables a DC motor control circuit to provide continuous linear or pulse modulation control among the stepped voltages in relation to the voltage output.

7 Claims, 8 Drawing Sheets

STEPPED COMPOUND VOLTAGE CONTROL CIRCUIT OF BATTERY IN COMBINATION WITH FIELD-CONTROL DC MOTOR DRIVING CIRCUIT

SUMMARY OF THE INVENTION

Since batteries are convenient to install, they are widely used for a variety of appliances, such as electric vehicles, etc. However, most batteries, whether powered by fuel, thermal energy, or solar energy, are physically limited to a single basic voltage. Generally speaking, one can make a battery's voltage and capacity selectable only by employing multiple series-connected batteries and supplying the output in accordance with the needs of the load by means of a stepped voltage, by controlling the output using serial linear members, or by operating the power supply using switches.

The present invention provides an efficient circuit design which involves providing a multiple output stepped compound voltage, and which further includes a field intensity control for enabling a DC motor control circuit to provide continuous linear control among the stepped voltages in relation to the voltage output by slowly increasing the speed of the motor or by slow feedback reduction, and further by controlling the motor by means of a series connection with limited current solid state switch members to provide a constant current output.

DETAILED DESCRIPTION OF THE PREFERRED EMBODIMENTS

Figure 1:
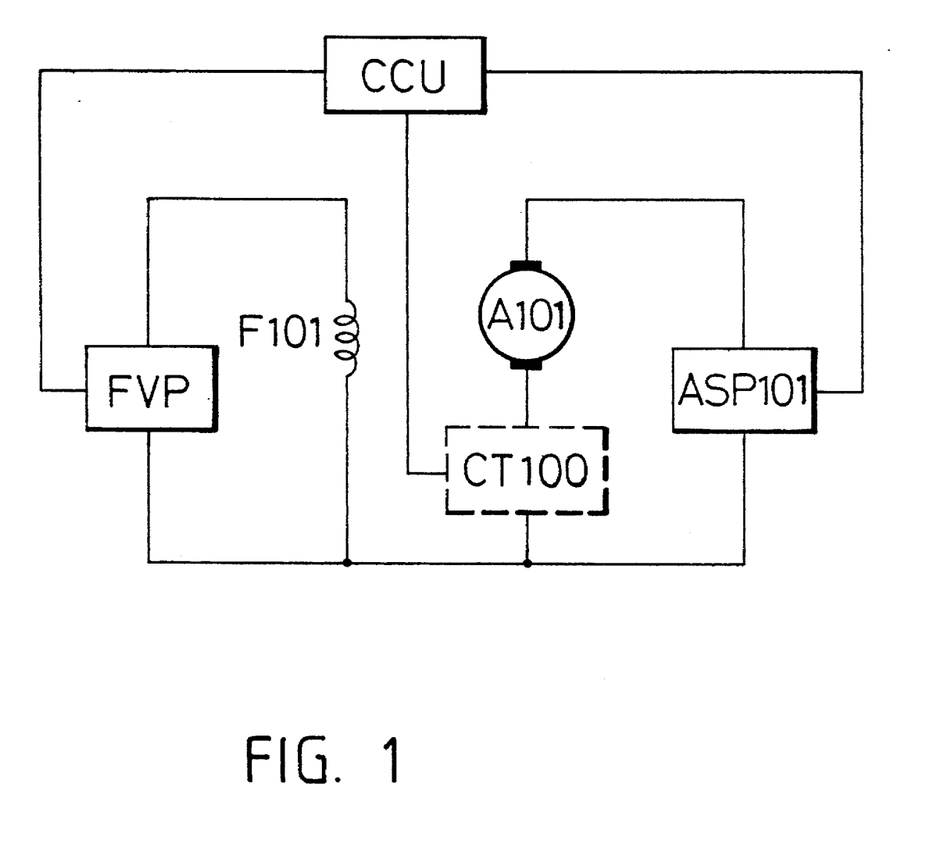
FIG. 1 is a block diagram of a field control DC motor driving circuit according to a preferred embodiment of the invention.

FIG. 1 shows a preferred embodiment of a stepped compound voltage power supply and field-control DC motor driving circuit, which includes a DC shunt or compound motor having at least a field winding F101 and an armature A101, and in which the armature A 101 can be driven by a driving circuit ASP101 constituted by the preferred stepped compound voltage power supply. The field generated by winding F101 may be changed in intensity by connecting the winding in series or in parallel, by tapping the winding, by series connecting the winding with a variable resistance, or by means of variable resistance or field controller FVP made up of a power supply of variable resistance.

The range of speed change in armature A101 caused by the aforesaid field intensity control which is greater than the range of speed change in the armature resulting from each step of stepped compound voltage can be made available for alternative use and to enable the armature driving speed to achieve linear change without interruption. In addition, those skilled in the art will appreciate that principles of the same principles of armature control can be provided for braking of a generator.

The field intensity and stepped voltage value may be subjected to manual control, CCU sequence control, or comparative value of the armature current and a manually set value, the armature current feedback signal being provided by detector CT100.

Except as specifically described below, the field control circuit illustrated in FIG 1 may be conventional. The following different kinds of stepped compound voltage circuit which may be used therein are unique, however, and will be described in detail.

Figure 2:
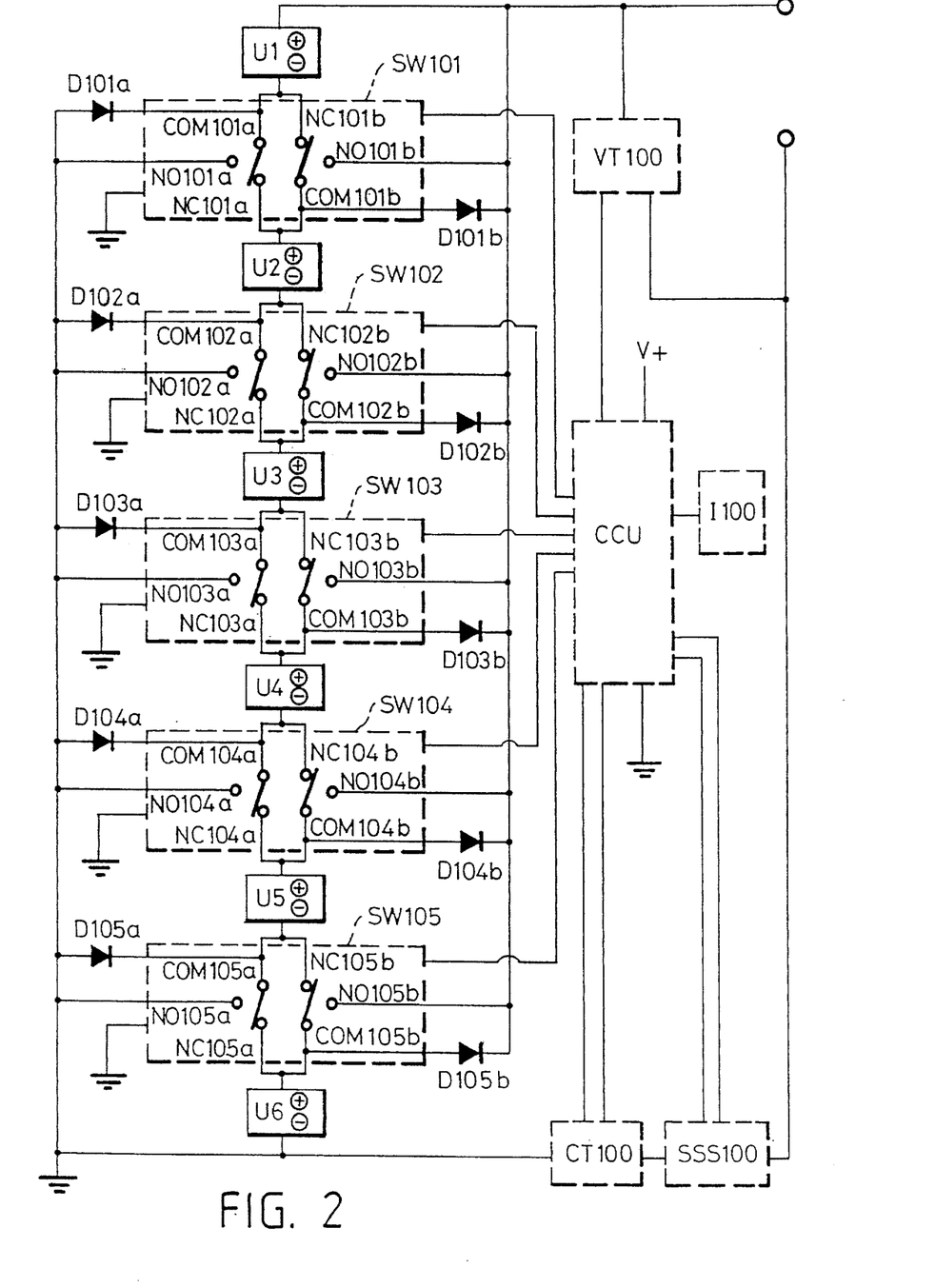
FIG. 2 shows an embodiment of a preferred compound voltage supply formed by two-pole and two-throw switches parallel connected with a diode for the DC motor armature control of FIG. 1.

FIG. 2 shows an embodiment of a compound voltage control circuit which uses double-throw switches SW101–SW105 in combination with diodes to vary the battery connections and thereby form a compound voltage output by alternatively switching between contacts multiply parallel connected to each end of shunt diodes D101a–D105b so as to eliminate forward bias voltage drops and thermal losses across the diodes.

The circuit illustrated in FIG. 2 is further combined with current detector CT100 and a linear or switch-mode solid state switch SSS100, and with a central control unit (CCU) to accept operation orders from an input device so as to control the electro-mechanical switches S101–S105 and solid state switch member SSS100 to adjust the output voltage current flow or the output constant voltage, to adjust the current based on feedback from current detector CT100, or to set the limits of the output current value.

By means of linear adjustment of the solid state switch member SSS100, or switching of the switch member on and off to serve as a PWM adjusting control, and by switching of the output between voltage levels by connecting respective batteries and diodes in series via the on-off switches, the lower voltage state becomes a voltage minimum and the higher voltage state becomes a maximum to provide continuous linear and PWM adjustment of the output voltage, the low ripple-wave voltage output which forms between the minimum voltage and the peak voltage being controlled by linear or PWM adjustment. When one of the electro-mechanical switches is turned on, the solid state switch SSS100 is held in the on position, and when the electro-mechanical switch is turned off, the solid state switch is cut off before the electro-mechanical switch is cut off to cut off the power supply and prevent sparking of the electro-mechanical switches.

Batteries U1–U6 may be made up of two or more sets of battery units of identical voltage and capacity, or at least of identical voltage, including both linear and quadratic storage batteries, solar batteries, fuel-powered batteries, or thermal batteries, and which are connected by means of a plurality of two-pole manual two-throw switches SW101–SW105, or drum switches, or other electro-mechanical switch members, such as magnetic or mechanically operated relays, etc., which are disposed between the battery units and in direct series connection therewith. The common contacts of the two sets of poles of each two-pole switch are in replacement series with the open contacts such that the common contact of pole a is connected to the close contact of pole b, and the common contact of pole b is connected to the close contact of pole a; and each connected pair of contacts is respectively connected to the positive and negative terminals of a battery unit, with each output side common switch contact being connected to the positive pole of the pole unit and also directly series connected to a diode connected between the open contact and further to the first battery unit and positive output terminal of the voltage supply. The input side common contact of each switch being connected to the negative end of a pole unit, with the common contact and open contact being directly connected in series with a diode connected between the open contact and the negative pole of the last battery and the negative terminal of the output. As indicated above, the electro-mechanical switch member can be composed of a switch directly driven by manual, magnetic, or mechanical power.

The operation of the circuit of this embodiment is as follows:

1. By using a common divider symmetrically to an on/off switch, and wholly open or wholly closed contacts, the circuit can provide multiple choices for a compound voltage output.

2. When output, all multiple contacts of the diodes are close so that they can eliminate forward bias voltage drops and thermal losses therein.

3. When turned on/off, the diodes provide a linear stepped voltage for lessening the switch voltage, and are used as a transient current path to prolong the life of the switch contact.

More specifically, the embodiment shown in FIG. 2 is thus made up of switches SW101–SW105 connected between six sets of battery units U1–U6 having voltage EB to form five interconnected battery units. Each switch has connected to it a diode D101a–D105a according to the principle that its input end multiples to pass the negative output and a diode D101b–D105b having an output end which multiples to pass the positive output end. When common contacts COM105a–COM105b and close contacts NC101a–NC105b of operating switches SW101–105 are connected, all battery units are connected in series and the output voltage is six times the voltage of the individual batteries. When switches SW102 and SW104 are controlled such that the respective common contacts COM102a and b and COM104 and b are connected to open contacts NO102a and b and NO104a and b, the output voltage will be 2×EB because batteries U1 and U2, U3 and U4, and U5 and U6 are respectively series connected to each other to form three parallel connected units. Finally, when switches SW101–SW105 are controlled such that common contacts COM101a–COM105b are all connected with open contacts NO101a–NO105b, the output voltage will be EB because batteries U1–U6 are all parallel connected. If the number of battery sets is increased to 24, one can obtain compound voltage levels of 1×EB, 2×EB, 3×EB, 4×EB, 6×EB, 8×EB, 12×EB, 24×EB. If the number of battery sets is increased to 36, one can obtain voltage levels of 1×EB, 2×EB, 3×EB, 4×EB, 6×EB, 9×EB, 12×EB, 18×EB, 36×EB, and so forth. The switches can be under manual control, or controlled by a central control unit (CCU) and command input unit I100 so as to control the switch unit to turn the compound voltage on/off, or to further linearly adjust or switch open the solid switch member SSS100 at the output terminal so as to adjust and control the electro-mechanical switch operation and solid state switch operation relative to the input value.

Figure 3:
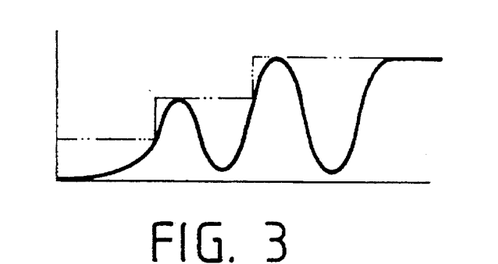
FIG. 3 shows a linearly adjusted compound voltage waveform.

The stepped voltage output can be directly trimmed either by means of the linear solid state switch member SSS100 or by controlling one of the electro-mechanical switches, making the output higher than the needed output value, and then using the CCU to control the driven current of the linear solid switch member so as to obtain adjustment of the linear output voltage. As is apparent from FIG. 3, if we want to trim the adjustment of a voltage large than a battery unit's voltage level, we can do it by means of the electro-mechanical switch unit and its thermal loss will be lessened.

Figure 4:
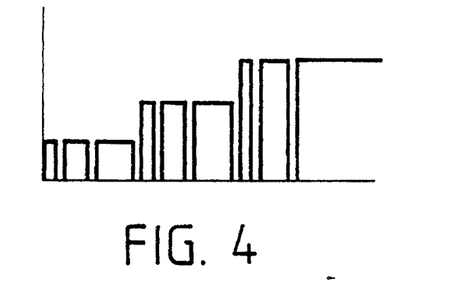
FIG. 4 shows a pulse modulated compound voltage waveform.

The stepped voltage output can also be trimmed directly by means of the switch member, or by means of controlling one of the electro-mechanical switches, making the output higher than the needed output value, and then using the central processing unit (CPU) to control the driven pulse range of the switched solid switch member so as to obtain adjustment of the average output voltage. As is apparent from FIG. 4, if we want to trim the adjustment of a voltage larger than that of battery unit's voltage level, we can do it by means of electro-mechanical switch unit. Because it has an intrinsic stepped voltage, the ripple-wave value is lower than that provided by direct adjustment of the voltage.

In this embodiment, the output current circuit is preferably connected in series with detector CT100 so as to check its output current value and provide feedback to controller CCU, according to an input unit instruction or a preset value in the controller, to control mutually and relatively the electro-mechanical switches and the solid state switch SSS100. The output terminal may further be connected to detector VT100 so as to inspect its output voltage value and also provide feedback to controller CCU to control the output voltage in accordance with instructions from an input device or a preset value, by mutual control of the solid state and electro-mechanical switches or preset value in CCU. As a result, the compound voltage supply of this embodiment can adjust to a load side voltage change caused by unsteady power voltage, for example, voltage drops in a battery due to drops arising from a reduction in residual storage power, in a manner similar to a non-compound voltage supply.

Figure 5:
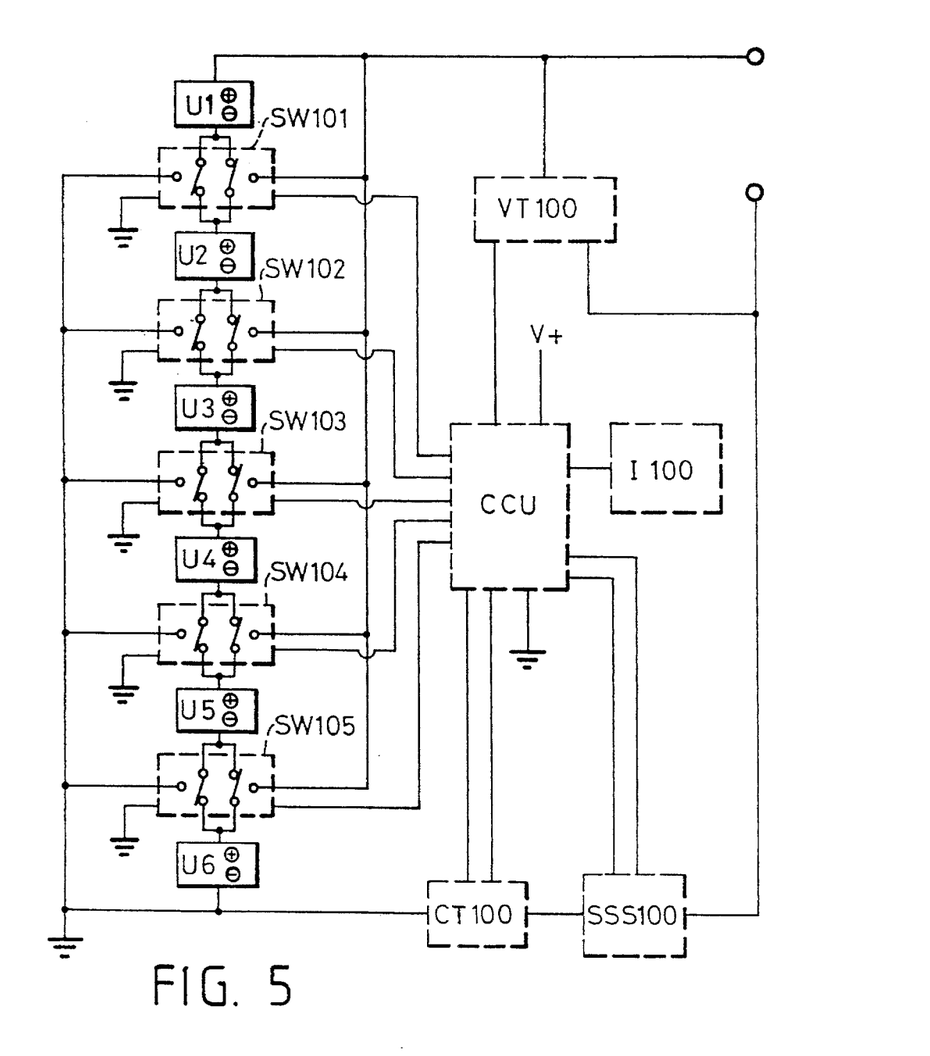
FIG. 5 is a schematic diagram of a second preferred compound voltage supply formed by a plurality of two-pole and two-throw switches for the DC motor armature control circuit shown in FIG. 1.

Those skilled in the art will appreciate that the above-described set operation order for the electro-magnetic and solid state switches may include manual, electro magnetic, mechanical, and flow control modes, and that the operation may be set or delayed by a mechanical command input or by an appropriate circuit. Also, in a variation of this embodiment which is satisfactory when the power capacity can be lower, the diodes can be omitted, and the two-pole two-throw switches can be directly turned on and off, as shown in FIG. 5.

Figure 6:
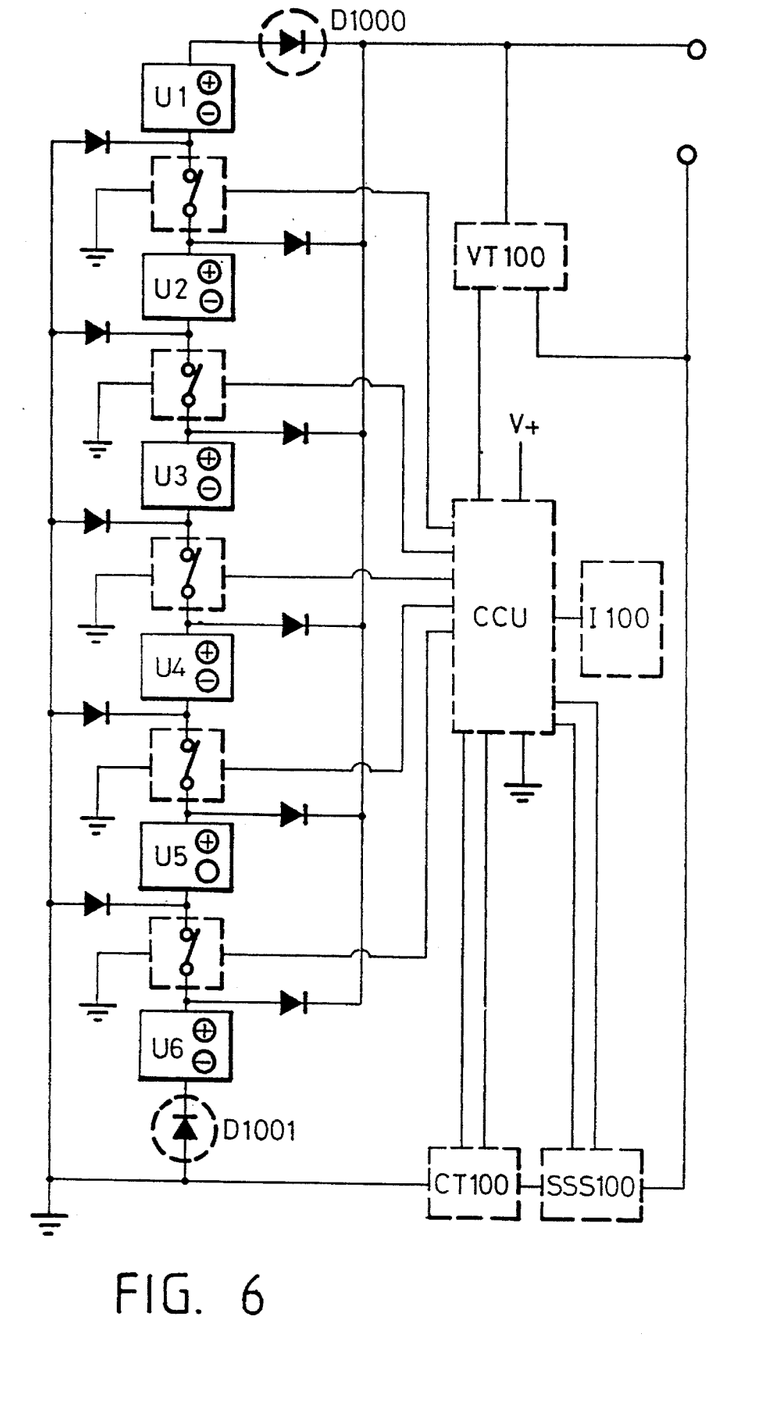
FIG. 6 is a schematic diagram of a third preferred compound voltage supply formed by single-pole switches and diodes for the DC motor armature control circuit shown in FIG. 1.

If circuit efficiency is not critical and the application is limited by space, we can connect single-pole single-throw switches to the diodes so as to obtain an on/off switching compound voltage output function, and in practice we can further connect a solid state switch member, an output voltage current measuring member, input unit, and controller CCU to produce the same functions shown in FIG. 6. Those skilled in the art will appreciate that, in this embodiment, diodes D1000 and D1001 are used for stabilizing the average output voltage and can be disposed in the circuit as needed.

Figure 7:
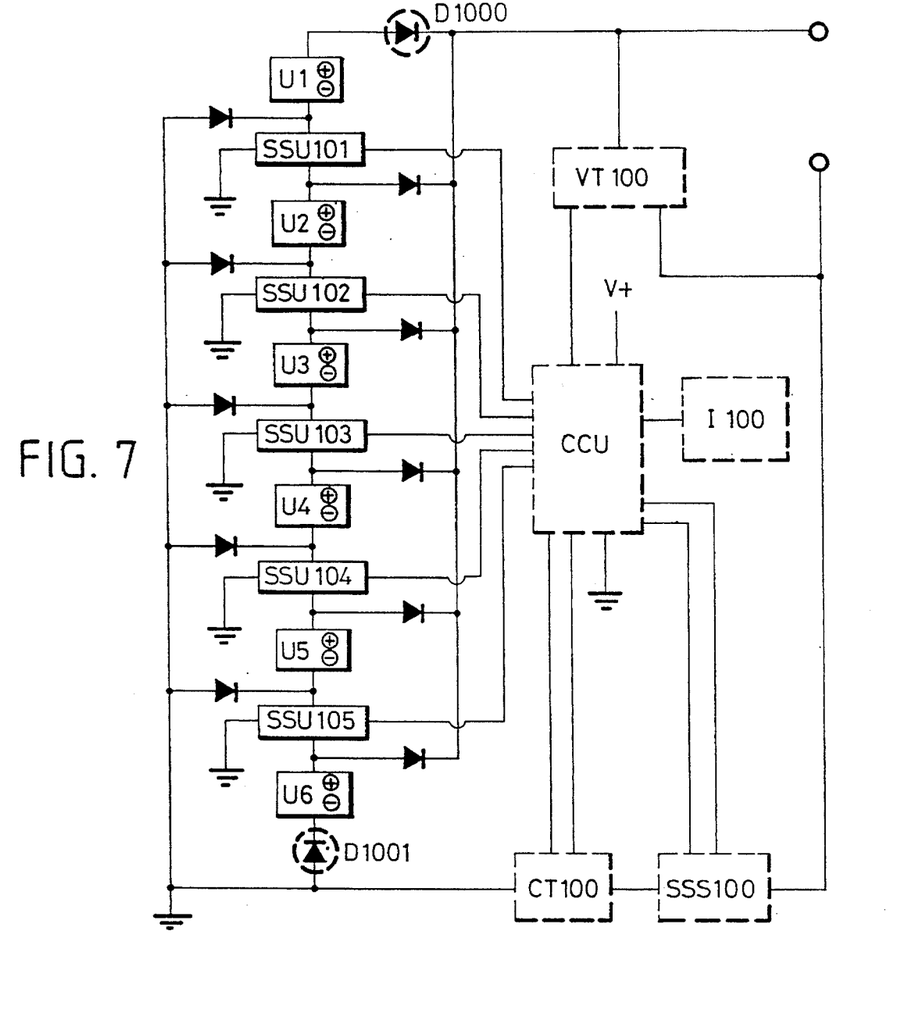
FIG. 7 is a schematic diagram of a fourth preferred compound voltage supply formed by solid state type switches and diodes for the DC motor armature control circuit of FIG. 1.

In a further variation of the preferred voltage supply, the electro-mechanical switches connected in series between voltage units in the preferred circuit can be replaced by solid state switch members, and connected to diodes so as to form a compound voltage output, as shown in FIG. 7, the compound voltage switch circuit of FIG. 7 otherwise having a switching function which is the same as that of FIG. 6. In the circuit of FIG. 7, D1000 and D101 again are diodes for smoothing the output voltage, and can be disposed in the circuit when needed. In this design we can further dispose electro-mechanical switch contacts on both sides of the solid state switch members to form units SSU101–SSU105 so as to reduce forward bias voltage drops, losses, and heat by using the following operation order: At the "on" position, operation of the individual solid state switches in units SSU101–SSU105 occurs before operation of the corresponding electro-mechanical switch. At the "off" position, operation of the solid state switch occurs after operation of the corresponding electro-mechanic switch.

Figure 8:
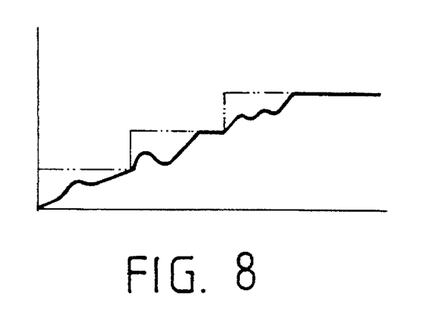
FIG. 8 is a diagram of linearly adjusted compound and stepped basic voltage waveforms.

When a solid state switch is used as the linear control or PWM switch control SSS100, an electro-mechanic switch which is series therewith will not be operative. The solid state switch and electro-mechanical switch can be controlled by controller CCU, or be manually, electro-magnetically, mechanically, or fluid dynamically controlled. By controlling the electro-mechanical switches, the output can surpass the needed output value, at which time controller CCU controls the driving current of each linear solid switch member, or by controlling the battery unit which has a higher voltage between mutually serial or parallel connected battery units, the basic voltage of the battery units may be used to attain linear output voltage adjustment. Referring to FIG. 8, if a large adjustment in voltage level is needed, the electro-mechanical switches can be used to achieve a lower heat loss.

Figure 9:
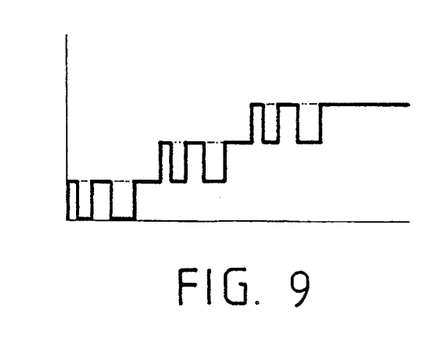
FIG. 9 is a diagram of pulse modulated compound and stepped basic voltage waveforms.

By operating the electro-mechanical switches, the output can surpass the needed output value, whereupon the controller CCU causes each solid switch member to output a pulsed current, or controls the driving current of each linear solid switch member, or exercises control over the battery unit which has the higher voltage level between mutually serial and parallel connected battery units, so as to attain average output voltage adjustment. For example, when controller CCU causes switch units SSU101, 102, 104, and 105 to be mutually connected, switch unit SSU103 may be controlled by pulses to obtain the output shown in FIG. 9. If we want to trim the adjustment of a voltage larger than a single battery unit's voltage level, we can do so by means of one of the electro-mechanical switch units. Because of the stepped basic voltage, the ripple-wave value is lower than that obtained by adjustment of the whole voltage directly.

If the linear or pulse control ripple range and stepped basic voltage are made up of battery units of equal voltage, in order to seek an average of electricity consumption, controller CCU can further be used to periodically alternate control of the solid state switch member so as to switch between batteries to alter the basic voltage supply and adjusting range, or to control the pulse modulation to like effect.

We can further serially connect measuring device CT100 to the output circuit of this embodiment so as to measure its output current value and feed it back to the controller CCU, and according to input instructions or a preset value in the controller, control mutually and relatively an electro-mechanical solid state switch, and at the output terminal parallel connect measuring device VT100 so as to measure its output voltage value, which is also fed back to the controller and in accordance with input instructions or a preset value mutually control the solid state switch and electro-mechanical switch. Similar to the conventional steady voltage circuit, because this circuit has a standard potential, in addition to adjusting the voltage change caused by unsteady load, it can adjust for load-side voltage changes caused by unsteady power voltage, such as drops in battery voltage due to reduced storage capacity.

As in the above embodiments, by including a serial connected solid state SSS100 in the circuit which functions as a constant adjusting component between the stepped voltage of linear and pulse control, that is, by means of linear adjustment or a PWM adjusting control disposed in series with a battery and diode, and by appropriate control of the on-off switches to step the compound voltage output, the lower step becomes a voltage minimum and the higher step becomes a peak for a continuous linearly or PWM adjusted output voltage, and thus can be made into a low ripple-wave voltage output, or a slowly rising or slowly dropping voltage.

Figure 10:
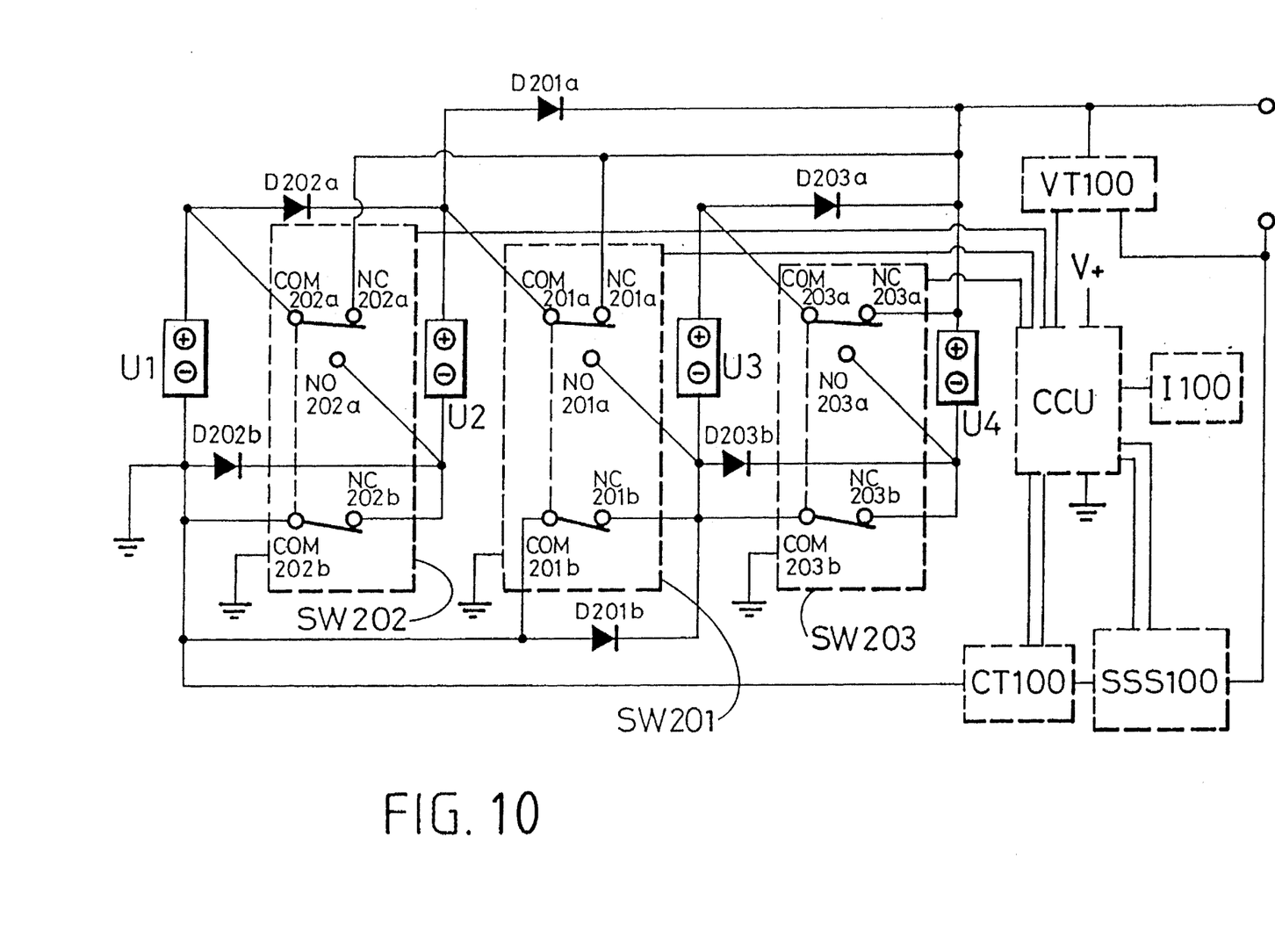
FIG. 10 is a schematic diagram of a fifth preferred compound voltage supply composed of a branched switch circuit with diodes for the DC motor armature control of FIG. 1.

Another application of the preferred circuit is shown in FIG. 10. This embodiment includes two or more sets of battery units of like voltage and capacity, or at least of like voltage, and branch connected solid state or electro-mechanical switches for changing the serial and parallel connections between the battery units so as to further change their output voltage. When outputting, the circuit shunts the ends of the diodes so as to eliminate the diodes's direct voltage reducing and thermal loss, and can further be combined with a current measurement device and linear or switch-mode solid state switch member, and with a central control unit to accept operation orders from an input device instruction so as to control the electro-mechanical and solid state switches for adjusting the output voltage, or setting the limits of output current value, and by means of linear adjustment or PWM control of the solid state switch member disposed in series with a battery and diode, in combination with control of the electro-mechanical switches to step the compound voltage output so that the low voltage becomes a minimum and the high voltage becomes a peak, a low ripple linearly or PWM controlled voltage output can be obtained between the base voltage and peak. When one of the electro-mechanicals switch is turned on, the time of operation of solid state switch is suspended at the on position (subject to resistance and capacitance load), and when it is turned off, the solid state switch is cut off before the electro-mechanical switch to cut off the power supply (subject to inductance, capacitance or resistance load) and thereby protect the electro-mechanical switches from sparking as they are turned on and off.

More specifically, in the embodiment of FIG. 10, the positive terminal of battery unit U1 and serially connected switch SW202 have a common contact COM202a directly series connected with diode D202a, and thereby with the positive pole of battery unit U2, and a common contact COM201a which is directly connected in series with diode D201a, and then connected to the output positive terminal of the voltage supply. The negative terminal of battery unit U1 connects to the negative output of the circuit and in series with switch SW202 of the common contact COM202b, and directly to series connected diode D202b. The positive output of diode D202b further connects to the open contact NO202a of switch SW202 and to close contact NC202b, which are commonly connected to the negative terminal battery of U2. The negative terminal of battery unit U1 is series connected to the common contact COM201b of switch SW201, and then directly to series connected diode D201b, the output positive end of diode D201b being connected to close contact NC201b of switch SW201 and to open contact NO201a and common contact COM203b of series connected switch SW203, and to the negative pole of battery unit U3, and then directly to series connected diode D203b. Finally, the output positive end of diode D203b is connected to close contact NC203b of switch SW203 and to the negative pole of battery unit U4. After the positive pole of battery U3 connects with common contact COM203a of serial-connected switch SW203, they are directly connected to diode D203, the output positive end of diode D203a being connected with close contact NC203a of serial-connected switch SW203 and to the positive pole of battery unit U4, and the positive output terminal of the circuit. Finally, close contact NC202a of serial connected switch SW202 and closed contact NC201a of serial-connected switch SW201 are connected to the positive output terminal of the circuit.

Figure 11:
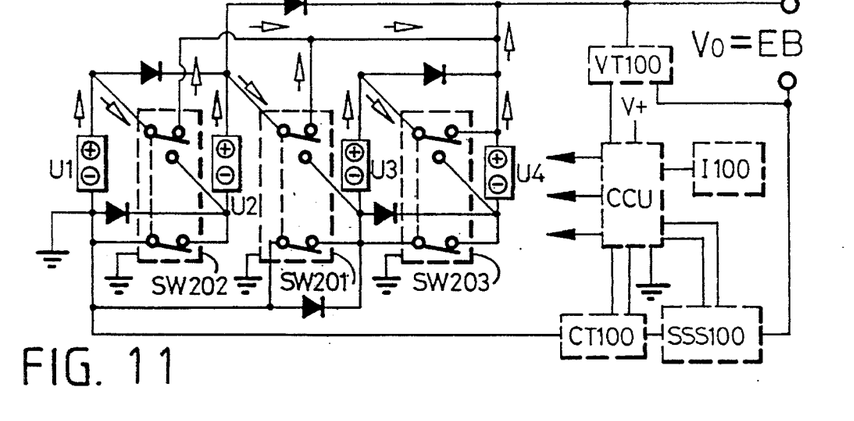
FIG. 11 shows a low voltage embodiment of the switch circuit of FIG. 10.

The circuit control of this embodiment is characterized in that:

1. When SW201, SW202, SW203 do not operate, battery units U1–U4 connect with the switch contact and output a low voltage because of their parallel connection; that is, 1 times the battery unit voltage, as shown in FIG. 11, which is a view of the low voltage output situation in FIG. 10.

Figure 12:
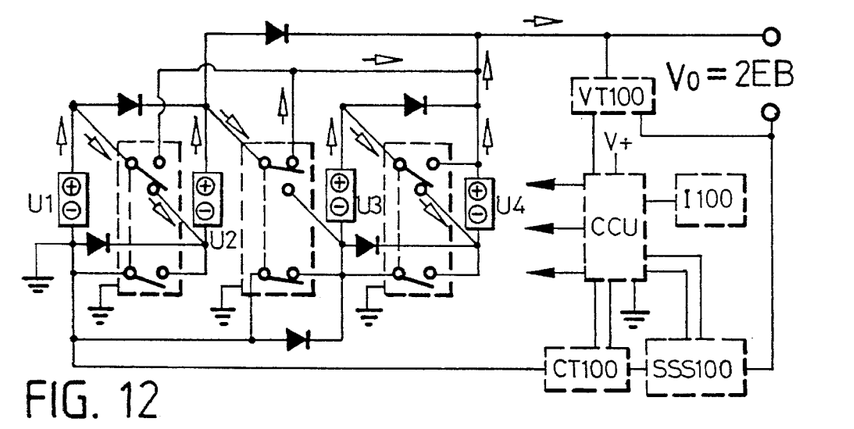
FIG. 12 shows an intermediate voltage embodiment of the switch circuit of FIG. 10.

2. When SW202, SW203 are in operation, battery unit U1 is serially connected with battery unit U2, battery unit is serially connected U3 with battery unit U4, and these two serially connected units are parallel connected to output a voltage of twice the individual battery unit voltage, as shown in FIG. 12, which is a view of the medium voltage output situation for the circuit of FIG. 10.

Figure 13:
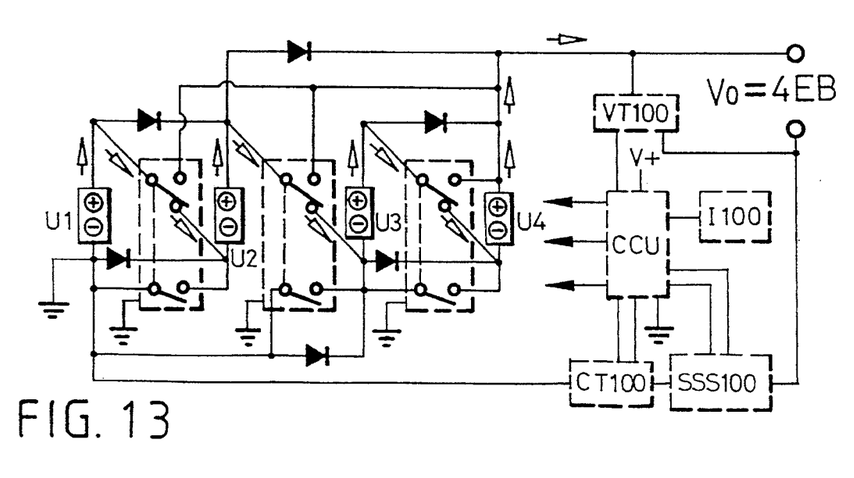
FIG. 13 shows a high voltage embodiment of the switch circuit of FIG. 10.

3. When switches SW201, SW202, and SW203 are in operation, battery units U1–U4 are serially connected so as to output a voltage of $2^2 \times$ times the battery unit voltage, as shown in FIG. 13, which is a view of the high output voltage situation for the circuit of FIG. 10.

Figure 14:
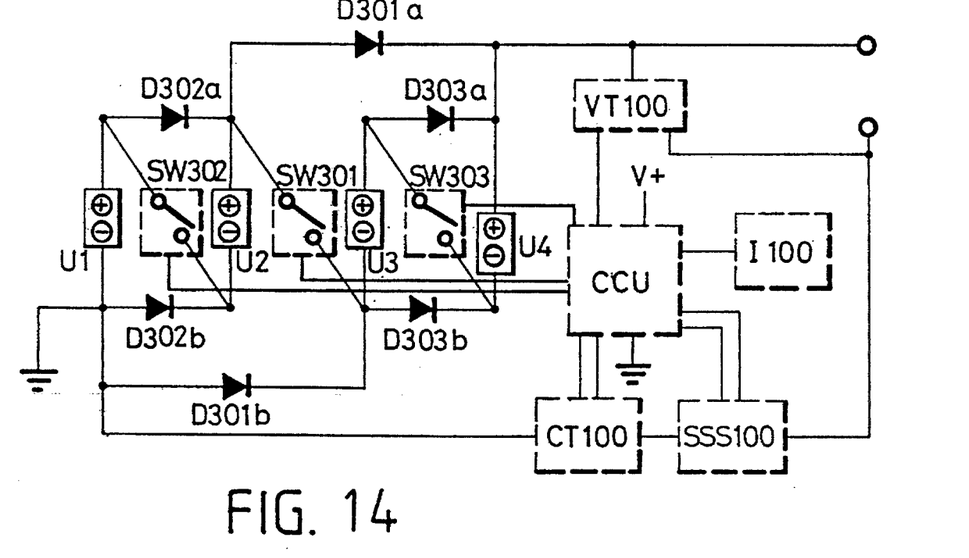
FIG. 14 shows a sixth preferred compound voltage supply formed by single-throw switches combined with diodes for the DC motor armature control of FIG. 1.

FIG. 14 is a view of a single-pole switch in series with solid type switch used for the battery diodes in series with a compound voltage DC motor armature control circuit, and further in combination with a current measurement device, a linear or switch-mode solid state switch member, and a controller CCU connected to accept commands from an input device so as to control the electro-mechanical and solid state switches for adjusting the output voltage, or to set the limits of the output current value. Again, by linear adjustment or PWM control of the solid switch member which is disposed in series in battery and diode, together with appropriate control of the on-off switches which provide the basic stepped compound voltage output, the low voltage becomes a minimum and the high voltage becomes a peak of the low ripple voltage output which forms between the base and peak and is controlled by linear adjustment or pulse modulation. Also, as in the previous embodiments, when an electro-mechanical switch is turned on, the time of operation of the solid state switch is suspended at the on position, and when it is turned off, the operation time of the solid state switch is less than that of the electro-mechanical switch to cut off the power supply and thereby protect the electro-mechanical switches from sparking as they are turned on and off.

In this embodiment, the circuit shown in FIG. 10 is combined with a current measuring device, a linear switching solid state switch member and a controller CCU to change switches SW201, SW202, SW203 into single-pole open switches and respectively parallel connect switch SW301 between the positive terminal of battery unit U1 and the negative terminal of battery U2, SW303 parallel connecting the positive terminal battery U3 and negative terminal of battery U4. Diodes D301a, D301b, D302a, D302b, D303a, D303b are the same as indicated by the connecting lines in FIG. 9, except that the serial-connected switches cannot eliminate forward bias voltage drops of the diode, all other functions being also the same as the circuit shown in FIG. 10.

Figure 15:
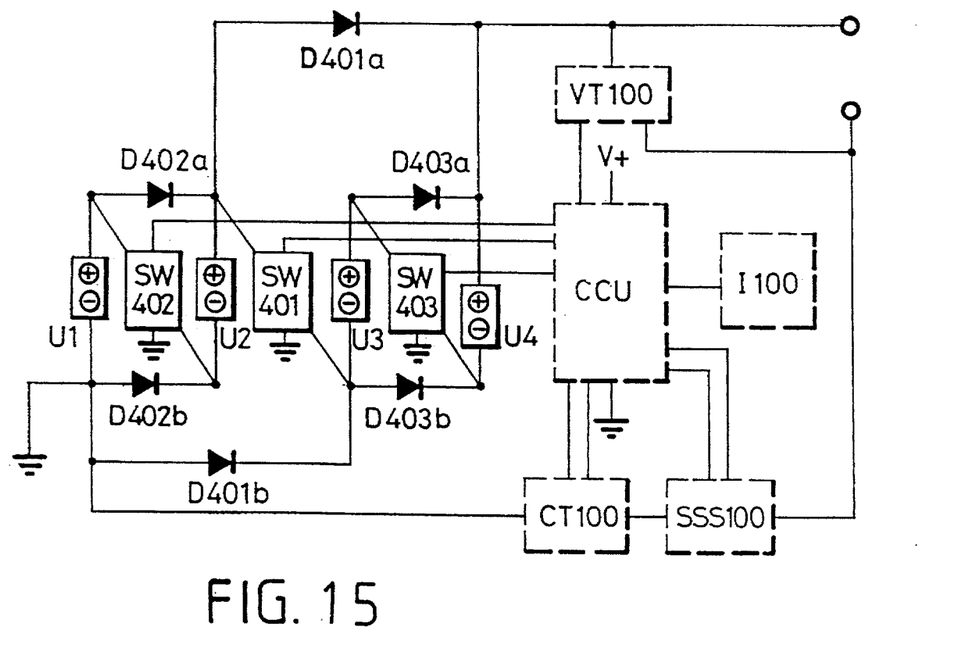
FIG. 15 shows a seventh preferred compound voltage switch circuit formed by solid state switch members for the DC motor armature control of FIG. 1.

Those skilled in the art will appreciate that, alternatively, linear solid state switch members SW401, SW402, and SW403 can be used to replace switches SW301, SW302, and SW303. Referring to FIG. 15, the disposition and function of diodes D401a, D401b, D402a, D402b, D403a, D403b are the same as the circuits in FIG. 10 and FIG. 14, and the switch function of this circuit is the same as that in FIG. 14. In this embodiment, the solid state switch members still function as switches and a series connected solid state switch member SSS100 can be added to the circuit to provide linear functions as in FIG. 8, or to function as a continuous regulating element between the stepped voltages of the PWM control as in FIG. 9.

In conclusion, the present invention relates to a new design for a compound voltage supply of a DC motor armature control circuit, the stepped compound voltage supplbeing combined with a linear or pulse modulating solid state switch member so as to attain non-sparking compound voltage switching and a low ripple linear or PWM adjustable voltage output, and further may include feedback to provide a current limiting or set voltage output adjustment function. In addition, the preferred circuit may use two-phase solid switch members to control the inverse input voltage current value so as to protect the circuit or provide compatibility with a conventional bridge switch member positive-negative output interface by, in each half period, letting the circuit complete the output from low to high and then from high to low potential to provide periodic output, and thereby by means of the synchronous relation between these two functions, gain an approximate sine wave (AC) output and further control multiple voltage output voltage values during the polarity exchanging period and each half period.

I claim:

1. In a stepped compound voltage power supply and field control for a DC motor driving circuit having at least one field winding, an armature, and a stepped compound voltage supply which includes a plurality of power supply sets arranged to be switched between parallel and series connections to provide the steps, the improvement wherein:

the field winding is connected to said stepped voltage supply by means of a solid state switch connected in series with said stepped voltage supply and selected from the group consisting of a linearly adjustable resistance and an on-off switch arranged to pulse modulate the voltage supply output, and wherein the field control further comprises means for controlling the solid state switch and therefore the field intensity manually or by means of a controller responsive to inputs including feedback of the armature current, said means for controlling the solid state member switch control of motor speed over a greater range of speed than is provided solely by a supply of stepped voltages to the armature.

2. A stepped compound voltage power supply and field control as claimed in claim 1, wherein the plurality of power supply sets comprise a plurality of battery sets arranged to be connected in series by closure of two pole two throw electro-mechanical switches, and further comprising first diodes connected between the solid state switch and common contacts of the electro-mechanical switches which are also connected to the negative terminals of the battery sets, and second diodes connected between the common contacts and a positive output terminal of the voltage supply, wherein poles of said electro-mechanical switches include, in addition to said common contacts, open contacts respectively directly connected to said solid state switch and said positive output terminal of said power supply, and close contacts respectively connected to positive and negative terminals of said battery sets, and further comprising means for controlling said solid state switch to cut off power to said electro-mechanical switches during switching to prevent sparking and eliminate losses across said first and second diodes.

3. A stepped compound voltage power supply and field control as claimed in claim 1, wherein the plurality of power supply sets comprise a plurality of battery sets arranged to be connected in series by closure of two pole two throw electro-mechanical switches, wherein the poles of said electro-mechanical switches include open contacts respectively directly connected to said solid state switch and a positive output terminal of said power supply, and close contacts respectively connected to positive and negative terminals of said battery sets, and further comprising means for controlling said solid state switch to cut off power to said electro-mechanical switches during switching to prevent sparking.

4. A stepped compound voltage power supply and field control as claimed in claim 1, wherein the plurality of power supply sets comprise a plurality of battery sets arranged to be connected in series by closure of single pole single throw electro-mechanical switches, and further comprising first diodes connected between said solid state switch and negative terminals of said battery sets, and second diodes connected between a positive output terminal of said voltage supply and positive terminals of said battery sets, and means for controlling said solid state switch to cut off power to said electro-mechanical switches during switching to prevent sparking and to prevent forward bias losses across said first and second diodes.

5. A stepped compound voltage power supply and field control as claimed in claim 1, wherein the plurality of power supply sets comprise a plurality of battery sets arranged to be connected in series by closure of switch units made up of solid state switches of said switch units and electro-mechanical switches, and further comprising means for controlling said solid state switches to cut off power to said electro-mechanical switches during switching to prevent sparking.

6. A stepped compound voltage power supply and field control as claimed in claim 1, wherein the plurality of power supply sets comprise two or more sets of battery units, and further comprising branch connected solid state or electro-mechanical switches and diodes for changing the serial and parallel connections between the battery units so as to further change their output voltage, and further including means for shunting the ends of the diodes so as to eliminate losses across the diodes.

7. A stepped compound voltage power supply and field control as claimed in claim 1, further comprising means for controlling said solid state switch based on feedback from a measuring device selected from the group consisting of a current detector connected to said armature, a voltage detector connected to the output of said voltage supply, and both said current detector and said voltage detector.

* * * * *